(12) United States Patent
Saito et al.

(10) Patent No.: US 6,602,961 B1
(45) Date of Patent: Aug. 5, 2003

(54) FLUORINE-CONTAINING ELASTOMER COMPOSITION

(76) Inventors: Satoru Saito, 433-1, Takado, Takahagi city, Ibaraki (JP); Haruyoshi Tatsu, 3-8-4, Benten-cho, Hitachi city, Ibaraki (JP); Hiroaki Murata, 30, Toyoda, Isohara-machi, Kitaibaraki city, Ibaraki (JP)

(*) Notice: Subject to any disclaimer, the term of this patent is extended or adjusted under 35 U.S.C. 154(b) by 0 days.

(21) Appl. No.: 08/500,714

(22) Filed: Jul. 11, 1995

Related U.S. Application Data

(63) Continuation of application No. 08/176,941, filed on Jan. 3, 1994, now abandoned.

(30) Foreign Application Priority Data

Jan. 14, 1993 (JP) ............................................... 5-021963

(51) Int. Cl.$^7$ .............................................. C08F 114/18
(52) U.S. Cl. ..................... 525/326.2; 524/544; 524/546; 524/805; 525/326.3; 525/326.4; 525/343; 525/346; 525/351; 525/353; 526/247; 526/248
(58) Field of Search .......................... 525/326.2, 326.3, 525/326.4, 343, 346, 351, 353; 524/544, 805, 546; 526/247, 248

(56) References Cited

U.S. PATENT DOCUMENTS

| | | | | |
|---|---|---|---|---|
| 3,114,778 A | * | 12/1963 | Fritz et al. .................. | 568/674 |
| 3,546,186 A | * | 12/1970 | Gladding et al. ............ | 526/245 |
| 4,138,426 A | | 2/1979 | England ...................... | 526/245 |
| 4,525,539 A | * | 6/1985 | Feiring ....................... | 525/326.3 |
| 4,529,784 A | * | 7/1985 | Finlay ........................ | 526/247 |
| 4,831,085 A | * | 5/1989 | Okabe et al. ................ | 525/387 |

FOREIGN PATENT DOCUMENTS

JP    59-109546    6/1984

* cited by examiner

*Primary Examiner*—Judy M. Reddick

(57) ABSTRACT

A fluorine-containing elastomer composition comprising a terpolymer of tetrafluoroethylene, perfluoro(lower alkyl vinyl ether) and perfluoro(ω-cyanoalkyl vinyl ether) and a bisaminophenyl compound represented by the following general formula as a curing agent:

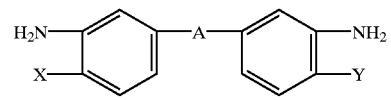

wherein A is an alkylidene group having 1 to 6 carbon atoms, a perfluoroalkylidene group having 1 to 10 carbon atoms, a $SO_2$ group, an O group, a CO group, or a carbon-carbon bond capable of directly coupling two benzene rings; and X and Y each are a hydroxyl group or an amino group can give a rubbery vulcanization product with a good processability and good physical properties by a commercially available cross-linking agent free from any safety problem.

6 Claims, No Drawings

FLUORINE-CONTAINING ELASTOMER COMPOSITION

This application is a continuation of application Ser. No. 08/176,941 filed Jan. 3, 1994 now abandoned.

BACKGROUND OF THE INVENTION

1. Field of the Invention

The present invention relates to a fluorine-containing elastomer composition, and more particularly to a cross-linkable elastomer composition of fluorine-containing elastomer having cyano groups as cross-linkable groups.

2. Related Prior Art

Japanese Patent Publication (Kokai) 59-109546 discloses a fluorine-containing elastomer composition, which comprises a terpolymer of tetrafluoroethylene, perfluoro(methyl vinyl ether) and cyano(perfluorovinyl ether) represented by the following general formula:

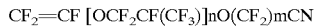

$CF_2=CF[OCF_2CF(CF_3)]nO(CF_2)mCN$ wherein n is 1 to 2 and m is 1 to 4, and a bisaminophenyl compound represented by the following general formula as a curing agent:

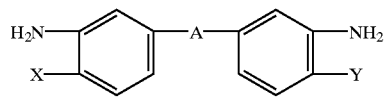

wherein A is an alkylidene group having 1 to 6 carbon atoms, a perfluoroalkylidene group having 1 to 10 carbon atoms, a $SO_2$ group, an O group, a CO group, or a carbon-carbon bond capable of directly coupling two benzene rings; and X and Y each are a hydroxyl group or an amino group.

However, the cyano(perfluorovinyl ether) to be copolymerized as a cross-linking site monomer in the terpolymer has been synthesized through many steps, as shown in U.S. Pat. No. 4,138,426 and thus is not an industrially preferable raw material and also fails to give a satisfactory compression set at an elevated temperature.

U.S. Pat. No. 3,546,186 discloses a terpolymer obtained by copolymerization of tetrafluoroethylene and perfluoro-(methyl vinyl ether) with perfluoro(ω-cyanoalkyl vinyl ether) represented by the following general formula as a cross-linking site monomer:

$CF_2=CFO(CF_2)nCN$ wherein n is 2 to 12, and also discloses that the cross-linking is carried out by tetraphenyl tin.

The perfluoro(ω-cyanoalkyl vinyl ether) used as a comonomer component in the terpolymer can be readily synthesized from a corresponding carboxylic acid ester with a high selectivity, and thus is an industrially utilizable compound, but the cross-linking of the resulting terpolymer is carried out through cyclization and terpolymerization of the cyano groups by tetraphenyl tin and thus not only press vulcanization requires such a longer time as 18 hours at 160° C., but also its industrial utilization still has problems in the cross-linking such as use of highly toxic tetraphenyl tin as a cross-linking agent and use of expensive silver oxide as a promoter. Furthermore, it fails to give a satisfactory compression set at an elevated temperature.

SUMMARY OF THE INVENTION

An object of the present invention is to provide a fluorine-containing elastomer composition comprising a copolymer containing a cross-linking site monomer capable of being readily synthesized with a good selectivity, as copolymerized, the composition being capable of giving a rubbery vulcanization product with a good processability and good physical properties by a commercially available cross-linking agent free from any safety problem.

DETAILED DESCRIPTION OF THE INVENTION

According to the present invention, there is provided a fluorine-containing elastomer composition, which comprises a terpolymer of tetrafluoroethylene, perfluoro(lower alkyl vinyl ether) and perfluoro(ω-cyanoalkyl vinyl ether) represented by the following general formula:

$CF_2=CFO(CF_2)nCN$ wherein n is an integer of 2 to 12, and a bisaminophenyl compound represented by the following general formula as a curing agent:

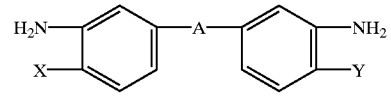

wherein A is an alkylidene group having 1 to 6 carbon atoms, a perfluoroalkylidene group having 1 to 10 carbon atoms, a $SO_2$ group, an O group, a CO group, or a carbon-carbon bond capable of directly coupling two benzene rings; and X and Y each are a hydroxyl group and an amino group.

The terpolymer of tetrafluoroethylene, perfluoro(lower alkyl vinyl ether) and perfluoro(ω-cyanoalkyl vinyl ether) for use in the present invention is a terpolymer obtained by copolymerizing a copolymer containing about 30 to about 75% by mole of tetrafluoroethylene and about 70 to about 30% by mole of perfluoro(lower alkyl vinyl ether) with about 0.1 to about 5% by mole, preferably about 1 to about 2% by mole of perfluoro(ω-cyanoalkyl vinyl ether) as a cross-linking site monomer. The terpolymer can contain various vinyl compounds or olefin fluorides, as copolymerized to such an extent as not to inhibit the copolymerization reaction and not to deteriorate physical properties of vulcanization product.

Copolymerization reaction can be carried out by emulsion polymerization or suspension polymerization in an aqueous medium or by solution polymerization in a perfluoro compound as a solvent, using a free radical generator. Emulsion polymerization is preferable for obtaining a terpolymer of larger molecular weight.

In the emulsion polymerization in an aqueous medium, ammonium persulfate, potassium persulfate, etc. are used as a free radical generator. These free radical generators can be also used as a redox system together with a reducing agent such as ammonium salts, sodium salts, potassium salts, etc. of sulfurous acid, thiosulfuric acid, etc. Ammonium salts of perfluorinated carboxylic acids can be usually used as an emulsifying agent, and ammonium perfulorooctanoate is particularly preferable. A pH-adjusting agent such as $Na_2HPO_4$, $NaH_2PO_4$, $K_2HPO_4$, KH2PO4, etc. can be usually used.

The copolymerization reaction can be carried out according to one charge polymerization procedure where predetermined amounts of the respective monomers are all charged into a reactor at one time and subjected to the polymerization reaction or according to a polymerization procedure of continuous addition at constant rates, where the respective monomers are continuously added to a reactor at constant rates under a constant pressure. The latter polymerization reaction procedure is preferable for obtaining polymers with good physical properties, where the polymerization pressure is kept under about 2 to about 50 kg/cm$^2$ gage and the polymerization temperature at about 40 to about 80° C. during the continuous addition at constant rates.

After the polymerization reaction, the resulting aqueous latex is salted out by an aqueous solution of water-soluble electrolyte such as sodium chloride, magnesium chloride, etc., recovered by filtration and dried, whereby a terpolymer can be obtained. In place of salting-out, the aqueous latex can be freezed, recovered by filtration and dried.

About 0.5 to about 5 parts by weight, preferably about 1 to about 2 parts by weight, of the bisaminophenyl cross-linking agent represented by the above-mentioned general formula, for example, as given below, can be added to 100 parts by weight of the terpolymer:

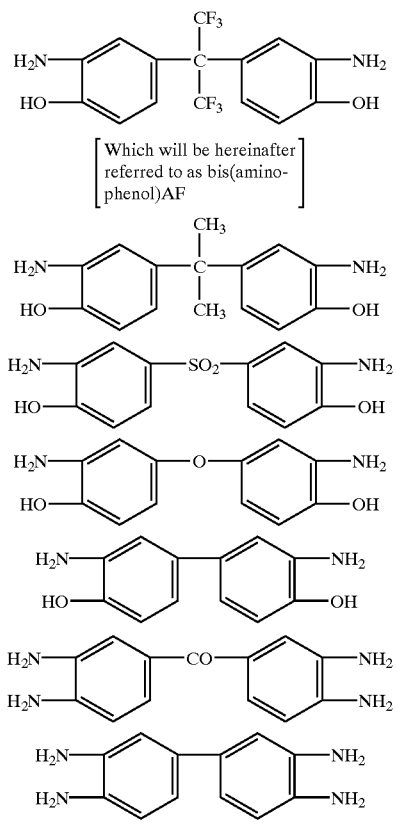

The fluorine-containing elastomer composition containing the above-mentioned components as essential ones can be further admixed properly, when required, with an inorganic filler such as carbon black, silica, etc., an acid receptor such as oxides, hydroxides or stearates of divalent metal, litharge, etc.: and necessary additives. The composition can be prepared by mixing in an open roll, etc. The cross-linking can be carried out by heating to about 160 to about 250° C. for about 10 to about 60 minutes. Secondary vulcanization, if required, can be carried out preferably in an inert gas atmosphere, for example, in a nitrogen gas atomosphere.

According to the present invention, there is provided a fluorine-containing elastomer composition comprising a copolymer containing a cross-linking site monomer capable of being readily synthesized with a good selectivity, as copolymerized, the composition being capable of giving a rubber vulcanization product with a good processability and good physical properties by a commercially available cross-linking agent free from any safety problem.

PREFERRED EMBODIMENTS OF THE INVENTION

The present invention will be described in detail below, referring to Examples.

REFERENCE EXAMPLE 1

200 ml of distilled water, 2.5 g of ammonium perfluorooctanoate and 4.4 g of $Na_2HPO_4.12H_2O$ were charged into a stainless steel autoclave having a net capacity of 500 ml, and then the autoclave was flushed with a nitrogen gas and then subjected to pressure reduction.

After the autoclave was cooled to about −50° C., the following compounds were successively charged into the autoclave.

| | |
|---|---|
| Perfluoro (5-cyanopentyl vinyl ether) [FCVE] | 6.4 g |
| Perfluoro(methyl vinyl ether) [FMVE] | 72 g |
| Tetrafluoroethylene [TFE] | 32 g |

Then, the autoclave was heated to 50° C., and 0.75 g of sodium sulfite and 3.75 g of ammonium persulfate were charged into the autoclave each as 25 ml of an aqueous solution to start polymerization reaction. The polymerization reaction was continued for 20 hours, and then unreacted gases were purged from the autoclave. The resulting aqueous latex was taken out of the autoclave, salted out and dried, whereby 18.0 g of white, rubbery terpolymer A was obtained.

Infrared absorption analysis of the terpolymer A revealed that the terpolymer consisted of 69.5% by mole of TFE, 30.3% by mole of FMVE and 0.2% by mole of FCVE (characteristic absorption of nitrile group: 2268 cm$^{-1}$).

REFERENCE EXAMPLE 2

In Reference Example 1, the amount of FCVE was changed to 8.2 g, that of FMVE to 83 g, and that of TFE to 28 g, and equal amounts of sodium sulfate in an aqueous solution state and ammonium persulfate in an aqueous solution state were added thereto at the point of 8 hours after the start of polymerization reaction, whereby 36.4 g of white, rubbery terpolymer B was obtained. The terpolymer consisted of 61.8% by mole of TFE, 37.7% by mole of FMVE and 0.5% by mole of FCVE.

REFERENCE EXAMPLE 3

In Reference Example 2, the polymerization temperature was changed to 65° C., whereby 41.5 g of white, rubbery terpolymer C was obtained. The terpolymer consisted of 58.6% by mole of TFE, 40.7% by mole of FMVE and 0.7% by mole of FCVE.

REFERENCE EXAMPLE 4

In Reference Example 2, the amount of FCVE was changed to 12.1 g, and the polymerization temperature to 65° C., whereby 31.2 g of white, rubbery terpolymer D was obtained. The terpolymer consisted of 62.1% by mole of TFE, 36.8% by mole of FMVE and 1.1% by mole of FCVE.

REFERENCE EXAMPLE 5

In Reference Example 2, the amount of FCVE was changed to 16.4 g, and the polymerization temperature to 65° C., whereby 22.4 g of white, rubbery terpolymer E was obtained. The terpolymer consisted of 67.7% by mole of TFE, 30.8% by mole of FMVE and 1.5% by mole of FCVE.

REFERENCE EXAMPLE 6

1.57 liters of distilled water, 27.3 of ammonium perfluorooctanoate and 23.7 g of $Na_2HPO_4 \cdot 12H_2O$ were charged into a stainless steel autoclave having a net capacity of 3 liters, and then the autoclave was flushed with a nitrogen gas and then subjected to pressure reduction. After the autoclave was cooled to about −50° C., the following compounds were successively charged into the autoclave.

| | |
|---|---|
| Tetrafluoroethylene [TFE] | 30 g |
| Perfluoro(methyl vinyl ether) [FMVE] | 50 g |
| Perfluoro (5-cyanopentyl vinyl ether) [FCVE] | 4.6 g |

Then, the autoclave was heated to 60° C., and 1.66 g of sodium sulfite and 9.08 g of ammonium persulfate were added thereto each as 50 ml of an aqueous solution to start polymerization reaction.

During the polymerization reaction, 27 g/hr of TFE, 43 g/hr of FMVE and 4.0 g/hr of FCVE were continuously added to the autoclave to keep the internal pressure of the autoclave under 9 kg/cm$_2$ gage. At the point of 10 hours after the start of polymerization reaction, the continuously addition was discontinued and the autoclave was kept in that state for one hour, and then the autoclave was cooled and remaining gases were purged. The resulting aqueous latex was taken out of the autoclave.

Then, the aqueous latex (solid content: 28% by weight) was freezed, washed with 10% ethanol and dried at 70° C. under the atmospheric pressure for 12 hours and further at 120° C. under reduced pressure for 8 hours, whereby 700 g of white, rubbery terpolymer F was obtained. The terpolymer consisted of 55.9% by mole of TFE, 42.7% by mole of FMVE and 1.4% by mole of FCVE and its reduced viscosity [measured in 1 wt. % solution of perfluoro(2-butyltetrahydrofuran)] was 1.04 ml/g.

EXAMPLE 1

| | |
|---|---|
| Terpolymer A | 100 parts by weight |
| Bis(aminophenol) AF | 2 parts by weight |
| Dicyclohexyl-18-Crown-6 | 0.5 parts by weight |
| MT carbon black | 10 parts by weight |
| Litharge | 2 parts by weight |

The foregoing components were mixed through a double roll rubber mill and press vulcanized at 180° C. for 5 minutes. Then, the resulting vulcanization product was subjected to measurement of vulcanization torque by a curelasto meter V (made by Orientec K.K.). An increase by 0.5 kg·cm was found, and the vulcanization was confirmed.

EXAMPLES 2 TO 4

In Example 1, the same amount of terpolymer C, D or E was used in place of the terpolymer A, and primary (press) vulcanization was carried out at 180° C. for one hour and then secondary (oven) vulcanization at 250° C. for 24 hours. Physical properties of the resulting vulcanization products are shown in the following Table 1 together with a torque increase span.

TABLE 1

| | Example 2 | Example 3 | Example 4 |
|---|---|---|---|
| Terpolymer | C | D | E |
| Torque increase span (kg·cm) | 3.1 | 3.9 | 4.8 |
| Breaking strength (kgf/cm$^2$) | 175 | 182 | 180 |
| Breaking Elongation (%) | 220 | 173 | 160 |

EXAMPLES 5 AND 6

| | |
|---|---|
| Terpolymer F | 100 parts by weight |
| Bis(aminophenol) AF | 1 parts by weight (Ex. 5) |
| Bis(aminophenol) AF | 2 parts by weight (Ex. 6) |
| MT carbon black | 20 parts by weight |

The foregoing components were mixed through a double roll rubber mill, and subjected to primary (press) vulcanization at 180° C. for 30 minutes and secondary (oven) vulcanization at two stages, i.e. at 210° C. for 18 hours and at 288° C. for 18 hours.

Physical properties in the normal state and compression set (ASTM method B with P24 O-ring at 275° C. for 70 hours) of the resulting vulcanization products are shown in the following Table 2 together with a torque increase span.

TABLE 2

| | | Example 5 | Example 6 |
|---|---|---|---|
| Torque increase span | (kg·cm) | 9.3 | 11.9 |
| Hardness | (JIS A) | 76 | 78 |
| 100% Modulus | (kgf/cm$^2$) | 92 | 132 |
| Breaking strength | (kgf/cm$^2$) | 192 | 194 |
| Breaking Elongation | (%) | 180 | 130 |
| Compression set | (%) | 22 | 13 |

COMPARATIVE EXAMPLE

| Component | Mixing ratio I | Mixing ratio II |
|---|---|---|
| Terpolymer B | 100 parts by weight | 100 parts by weight |
| Tetraphenyl tin | 6 parts by weight | — parts by weight |
| MT carbon black | 10 parts by weight | 10 parts by weight |
| Silver oxide | — parts by weight | 4.8 parts by weight |

The foregoing components were mixed through a double roll rubber mill and subjected to vulcanization at 180° C. for two hours. No increase in the vulcanization torque by a curelasto meter V was found at all.

What is claimed is:

1. A fluorine-containing elastomer composition, which comprises a terpolymer obtained by polymerizing tetrafluoroethylene, perfluoro(methyl vinyl ether) and perfluoro(ω-cyanoalkyl vinyl ether) represented by the following formula:

and, as a curing agent, a bisaminophenyl compound represented by the formula:

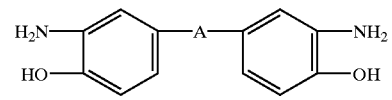

-continued or

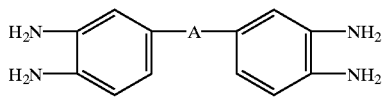

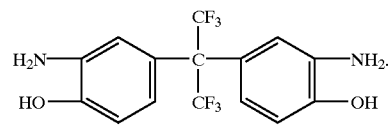

wherein A is an alkylidene group having 1 to 6 carbon atoms, a perfluoroalkylidene group having 1 to 10 carbon atoms, an $SO_2$ group, an O group, or a carbon-carbon bond capable of directly coupling two benzene rings.

2. The fluorine-containing elastomer composition according to claim 1, wherein the terpolymer is a polymer obtained by polymerizing tetrafluoroethylene and perfluoro(methyl vinyl ether) with about 0.1 to about 5% by mole of perfluoro (ω-cyanoalkyl vinyl ether) as a cross-linking site monomer, wherein the polymerization of the terpolymer is carried out under a condition that a mole ratio of tetrafluoroethylene to perfluoro(methyl vinyl ether) is about 30 to about 70% by mole to about 70 to about 30% by mole.

3. The fluorine-containing elastomer composition according to claim 1, wherein the bisaminophenyl compound has the formula:

4. The fluorine-containing elastomer composition according to claim 1, wherein about 0.5 to about 5 parts by weight of the bisaminophenyl compound is added to 100 parts by weight of the terpolymer.

5. The fluorine-containing elastomer composition according to claim 2, wherein about 0.5 to about 5 parts by weight of the bisaminophenyl compound is added to 100 parts by weight of the terpolymer.

6. The fluorine-containing elastomer composition according to claim 3, wherein about 0.5 to about 5 parts by weight of the bisaminophenyl compound is added to 100 parts by weight of the terpolymer.

* * * * *